(12) United States Patent
Zhou

(10) Patent No.: US 10,859,761 B1
(45) Date of Patent: Dec. 8, 2020

(54) BACKLIGHT MODULE AND DISPLAY DEVICE

(71) Applicant: WUHAN CHINA STAR OPTOELECTRONICS TECHNOLOGY CO., LTD, Hubei (CN)

(72) Inventor: Zheng Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/613,430

(22) PCT Filed: Jun. 10, 2019

(86) PCT No.: PCT/CN2019/090567
§ 371 (c)(1),
(2) Date: Nov. 14, 2019

(30) Foreign Application Priority Data

May 24, 2019 (CN) .......................... 2019 1 0438126

(51) Int. Cl.
*F21V 8/00* (2006.01)
*G02F 1/1333* (2006.01)

(52) U.S. Cl.
CPC ......... *G02B 6/0088* (2013.01); *G02B 6/0068* (2013.01); *G02B 6/0091* (2013.01); *G02F 2001/133317* (2013.01)

(58) Field of Classification Search
CPC .. G02B 6/0088; G02B 6/0091; G02B 6/0068; G02F 2001/133317
See application file for complete search history.

(56) References Cited

U.S. PATENT DOCUMENTS

| | | | |
|---|---|---|---|
| 9,952,381 B2* | 4/2018 | Yoshikawa | G02F 1/133308 |
| 2010/0188599 A1* | 7/2010 | Arihara | G02B 6/0091 |
| | | | 349/60 |
| 2015/0212363 A1* | 7/2015 | Nakazawa | G02F 1/133308 |
| | | | 349/60 |
| 2017/0343721 A1* | 11/2017 | Takada | G02B 6/0021 |
| 2018/0113353 A1* | 4/2018 | Chen | G02F 1/133308 |
| 2020/0026127 A1* | 1/2020 | Lin | G02F 1/133308 |

* cited by examiner

*Primary Examiner* — Joseph L Williams
*Assistant Examiner* — Jose M Diaz
(74) *Attorney, Agent, or Firm* — Mark M. Friedman

(57) ABSTRACT

A backlight module and a display device are provided. The backlight module has a plastic frame and a light guide plate located in the plastic frame. Convex portions and groove portions aligned to the convex portions are formed on the plastic frame to form an elastic structure. One of the convex portions is configured to contact with a sidewall of the light guide plate, and one of the convex portions is offset toward a side of one of the groove portions by being pressed by the light guide plate, thereby deforming one of the groove portions, so that the elastic structure and the light guide plate form an interference fit. Therefore, the light guide plate is fixed in the plastic frame without offset.

17 Claims, 2 Drawing Sheets

BACKLIGHT MODULE AND DISPLAY DEVICE

FIELD OF DISCLOSURE

The present disclosure relates to displays, and more particularly to a backlight module and a display device.

BACKGROUND OF DISCLOSURE

With development of display technology, there are more and more applications of vehicle display modules. Among them, due to high reliability requirements of vehicle regulations, structural design requirements for vehicle displays are relatively high.

For the high reliability requirements of the vehicle regulations, if a location of a light guide plate in a backlight source is not limited and fixed, there will be a problem that the light guide plate hits a sidewall to generate abnormal sound when the module is shaken and a problem of optical defects caused by mesh scratches on the light guide plate during vibration. At present, for a vehicle display module, multiple rubber blocks are usually used to hold the light guide plate for limiting a location of the light guide plate.

Due to relatively soft material of the rubber blocks, a processing technology is limited, and there may be uneven thickness during cutting, which may cause the light guide plate not to be assembled in a preset location. Since a plurality of rubber blocks are required to be additionally assembled, a backlight assembly process is increased to result in an increase in cost.

Therefore, the prior art has drawbacks and is in urgent need of improvement.

SUMMARY OF DISCLOSURE

The present disclosure provides a backlight module and a display device, which can solve problems of a conventional vehicle display device, where a light guide plate hits a sidewall to generate abnormal sound when a backlight module is shaken and where optical defects are caused by mesh scratches on the light guide plate, and which can solve problems that the light guide plate assembly accuracy is not good, and the process is complicated.

To solve the above problems, technical solutions provided by the present application are as follows.

The present application provides a backlight module comprising:
a plastic frame; and
a light source, a light guide plate, and an optical film sheet, all of which being located in the plastic frame;
wherein at least two sidewalls of the plastic frame are provided with an elastic structure, the elastic structure contacts with a sidewall of the light guide plate and a sidewall of the optical film sheet, and the elastic structure forms an interference fit with the light guide plate and the optical film sheet to fix the light guide plate and the optical film sheet in the plastic frame.

In a backlight module of the present application, the elastic structure is integrally formed with the plastic frame, the elastic structure comprises convex portions and groove portions aligned to the convex portions, the convex portions are located on a sidewall of the plastic frame adjacent to a side of the light guide plate, and openings of the groove portions are located in a top portion of the plastic frame.

In a backlight module of the present application, one of the groove portions is at least aligned to one of the convex portions, wherein length of one of the groove portions is greater than or equal to length of one of the convex portions in a length extending direction of the one of the groove portions.

In a backlight module of the present application, depth of one of the groove portions is greater than or equal to width of one of the convex portions in a depth extending direction of the one of the groove portions.

In a backlight module of the present application, a distance between a boundary of the plastic frame adjacent to the side of the light guide plate and one of the groove portions is less than or equal to a distance between a boundary of the plastic frame away from the side of the light guide plate and one of the groove portions.

In a backlight module of the present application, cross-sectional shapes of the convex portions are at least one of a rectangular shape, a trapezoidal shape, an arc shape, and any combination thereof.

In a backlight module of the present application, a rounded corner is formed between an inner wall of one of the groove portions adjacent to the side of the light guide plate and an adjacent inner wall.

In a backlight module of the present application, when the light guide plate is assembled, a sidewall of the light guide plate contacts with one of the convex portions of the elastic structure, one of the convex portions is offset toward a side of one of the groove portions due to being squeezed by the light guide plate, and one of the groove portions is deformed such that the elastic structure forms the interference fit with the light guide plate.

In a backlight module of the present application, when the optical film sheet is assembled, a sidewall of the optical film sheet contacts with one of the convex portions of the elastic structure, one of the convex portions is offset toward a side of one of the groove portions by the optical film sheet, and one of the groove portions is deformed such that the elastic structure forms an interference fit with the optical film sheet.

To solve the above problems, the present application further provides a backlight module comprising:
a plastic frame; and
a light source, a light guide plate, and an optical film sheet, all of which being located in the plastic frame;
wherein the plastic frame is provided with an elastic structure, the elastic structure contacts with a sidewall of the light guide plate, and the elastic structure forms an interference fit with the light guide plate to fix the light guide plate in the plastic frame.

In a backlight module of the present application, the elastic structure is integrally formed with the plastic frame, the elastic structure comprises convex portions and groove portions aligned to the convex portions, the convex portions are located on a sidewall of the plastic frame adjacent to a side of the light guide plate, and openings of the groove portions are located in a top portion of the plastic frame.

In a backlight module of the present application, one of the groove portions is at least aligned to one of the convex portions, wherein length of one of the groove portions is greater than or equal to length of one of the convex portions in a length extending direction of the one of the groove portions.

In a backlight module of the present application, depth of one of the groove portions is greater than or equal to width of one of the convex portions in a depth extending direction of the one of the groove portions.

In a backlight module of the present application, a distance between a boundary of the plastic frame adjacent to the side of the light guide plate and one of the groove portions is less than or equal to a distance between a boundary of the plastic frame away from the side of the light guide plate and one of the groove portions.

In a backlight module of the present application, cross-sectional shapes of the convex portions are at least one of a rectangular shape, a trapezoidal shape, an arc shape, and any combination thereof.

In a backlight module of the present application, a rounded corner is formed between an inner wall of one of the groove portions adjacent to the side of the light guide plate and an adjacent inner wall.

In a backlight module of the present application, when the light guide plate is assembled, a sidewall of the light guide plate contacts with one of the convex portions of the elastic structure, one of the convex portions is offset toward a side of one of the groove portions due to being squeezed by the light guide plate, and one of the groove portions is deformed such that the elastic structure forms the interference fit with the light guide plate.

To solve the above problems, the present application further provides a display device comprising a display panel and the backlight module described above.

Beneficial effects of the present application are as follows: compared with the conventional vehicle display device, the backlight module and the display device provided by the present application form an elastic structure by designing convex portions and groove portions on a plastic frame. When the elastic structure is in contact with a side wall of the light guide plate, the convex portions are squeezed by the light guide plate to deform the groove portions, so that the elastic structure forms an interference fit with the light guide plate to achieve limiting and fixing a location of the light guide plate. By adopting this design, cost and production man-hour of the additional design of the rubber blocks can be omitted, and at the same time, a phenomenon that a light guide plate hits a sidewall to generate abnormal sound when a backlight module is shaken and a phenomenon of optical defects caused by mesh scratches on the light guide plate can be avoided.

DESCRIPTION OF DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

DETAILED DESCRIPTION OF PREFERRED EMBODIMENTS

The following description of the embodiments with reference to the appended drawings is used for illustrating specific embodiments which may be used for carrying out the present disclosure. The directional terms described by the present disclosure, such as "upper", "lower", "front", "back", "left", "right", "inner", "outer", "side", etc. are only directions by referring to the accompanying drawings. Thus, the used directional terms are used to describe and understand the present disclosure, but the present disclosure is not limited thereto. In figures, elements with similar structures are indicated with the same numbers.

The present application is directed to a conventional vehicle display device, which exists problems of a conventional vehicle display device, wherein a light guide plate hits a sidewall to generate abnormal sound when a backlight module is shaken and wherein optical defects are caused by mesh scratches on the light guide plate, and which can solve technical problems that the light guide plate assembly accuracy is not good, and a process is complicated.

A backlight module provided by the present application is applied to a vehicle display device, but is not limited thereto, and can also be applied to a mobile electronic device or a wearable electronic device and other display devices.

Figure 1:
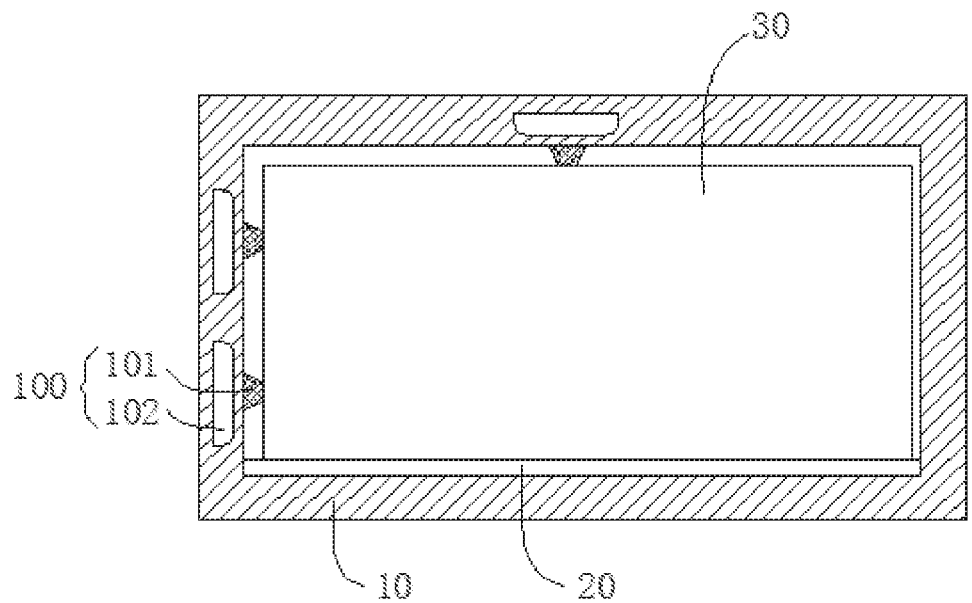
FIG. 1 is a schematic structural diagram of a backlight module provided by an embodiment of the present application.

As shown in FIG. 1, FIG. 1 is a schematic structural diagram of a backlight module provided by an embodiment of the present application. The backlight module provided in this embodiment can be an edge-type backlight module or a direct-type backlight module. The backlight module includes a plastic frame 10, a light source 20 located in the plastic frame 10, a light guide plate 30, and an optical film sheet (not shown). The plastic frame 10 is provided with an elastic structure 100, and the elastic structure 100 contacts with a sidewall of the light guide plate 30. The elastic structure 100 forms an interference fit with the light guide plate 30 to fix the light guide plate 30 in the plastic frame 10.

The elastic structure 100 is integrally formed with the plastic frame 10. The elastic structure 100 comprises convex portions 101 and groove portions 102 aligned to the convex portions 101. The convex portions 101 are located on a sidewall (or a side surface) of the plastic frame 10 adjacent to a side of the light guide plate 30, and openings of the groove portions 102 are located in a top portion of the plastic frame 10.

It can be understood that the backlight module is configured to align with the display panel, and the top portion of the plastic frame 10 is a side of the backlight module attached to the display panel.

As shown in FIG. 1, one of the groove portions 101 is aligned to one of the convex portions 102 to form the elastic structure. Length of the groove portions 102 is greater than or equal to length of the convex portions 101 in a length extending direction of the groove portions 102. Depth of one of the groove portions 102 is greater than or equal to width of one of the convex portions 101 in a depth extending direction of the one of the groove portions 102. That is, in a direction of a side of the light guide plate 30 toward the plastic frame 10, a projection of the convex portion 101 on a sidewall of the plastic frame 10 falls into a projection range of the groove portion 102 on a sidewall of the plastic frame 10. Of course, it is not limited thereto.

In an embodiment, in the side of the light guide plate 30 toward the side of the plastic frame 10, the projection of the convex portion 101 on the sidewall of the plastic frame 10 is located at an intermediate position of the projection of the groove portion 102 on the sidewall of the plastic frame 10.

A groove width of one of the groove portion 102 is smaller than a width of the plastic frame 10. A distance between a boundary of the plastic frame 10 adjacent to the side of the light guide plate 30 and one of the groove portions 102 is less than or equal to a distance between a boundary of the plastic frame 10 away from the side of the light guide plate 30 and one of the groove portions 102. In FIG. 1, the width of the plastic frame 10 located at both sides of the one of the groove portions 102 is the same, and the width can be kept at about 0.6 mm.

In the present embodiment, the depth of the groove portions 102 can be designed according to an actual process. However, a position of the elastic structure 100 on the plastic frame 10 should be corresponding to a preset position of the light guide plate 30 in the plastic frame 10.

A height of one of the convex portions 101 is slightly greater than a distance between an edge of the light guide plate 30 and the plastic frame 10, which can be about 0.1 mm to 0.5 mm greater than the spacing. A specific height may be defined according to an actual process, as long as the top portion of the convex portion 101 contacts with the light guide plate 30 and an interference fit is formed.

The elastic structure 100 is disposed on at least two sidewall of the plastic frame 10. The figures only show that the elastic structure 100 is disposed on two adjacent sidewalls of the plastic frame 10. Of course, it can also be on sidewalls of opposite sides, and there is no limitation here. In addition, a plurality of elastic structures 100 may be formed on a sidewall of the plastic frame 10 in case of space permitting. It can be ensured that the light guide plate 30 does not cause a large displacement so as to cause abnormal sound and vibration scratches.

In another embodiment, the elastic structure 100 not only forms the interference fit with the light guide plate 30, but also forms an interference fit with the optical film sheet, including but not limited to a reflecting plate, a diffusion plate, etc.

In another embodiment, the convex portions 101 are in step-shaped and can be applied in the light guide plate 30 with different sizes, and a stepped structure can also ensure that the light guide plate 30 does not easily slide out of the convex portions 101. The specific shape of the convex portions 101 can be set according to an actual process.

The embodiment can avoid a phenomenon that, when the backlight module is shaken, the light guide plate 30 hits the sidewall of the plastic frame 10 to generate an abnormal sound and to generate cause optical defects mesh scratches of the light guide plate 30. Since the backlight module of the embodiment directly adopts a part of the plastic frame 10 as the elastic structure 100, it is not necessary to add a new process and structure, thereby eliminating cost and manufacturing man-hour of additionally designing rubber blocks.

Figure 2:
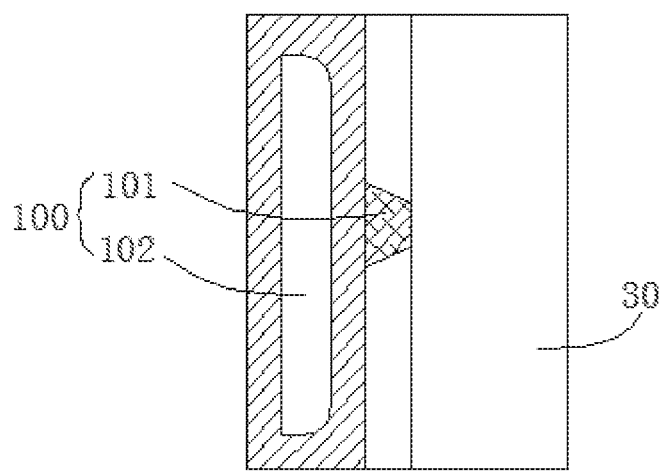
FIG. 2 is a schematic structural diagram of an elastic structure, before being deformed, of a backlight module according to an embodiment of the present disclosure.

As shown in FIG. 2, FIG. 2 is a schematic structural diagram of an elastic structure, before being deformed, of a backlight module according to an embodiment of the present disclosure. The convex portions 101 of the elastic structure 100 are configured to contact an edge of the light guide plate 30, and a gap exists between other portions of the plastic frame 10 and the light guide plate 30. In this embodiment, a cross-sectional shape of the convex portions 101 is trapezoid, and a length of the lower bottom side of the trapezoid is about 5 mm, but not limited thereto.

A rounded corner is formed between an inner wall of one of the groove portions 102 adjacent to the side of the light guide plate 30 and an adjacent inner wall. During deformation of the groove portions 102, stress concentration is prevented from causing the plastic frame 10 between the convex portions 101 and the groove portions 102 to be broken. Alternatively, the corners of the grooved portions 102 are all provided with rounded corners. Alternatively, a corner of the convex portions 101 and the plastic frame 10 is designed to be rounded.

Cross-sectional shapes of the convex portions 101 include, but is not limited to, at least one of a rectangular shape, a trapezoidal shape, an arc shape, and any combination thereof.

Figure 3:
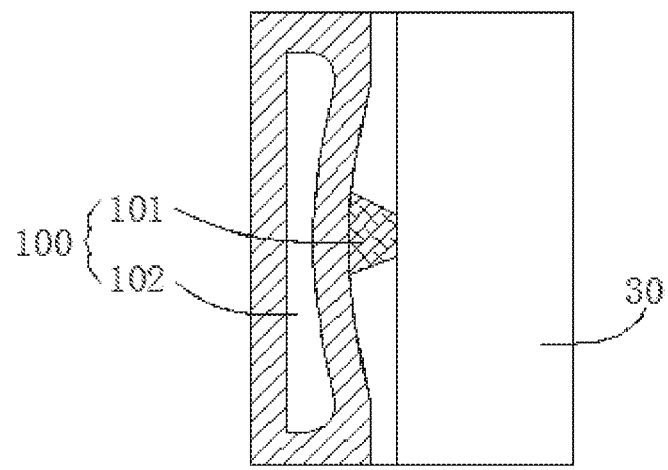
FIG. 3 is a schematic structural diagram of an elastic structure, after being deformed, of a backlight module according to an embodiment of the present disclosure.

As shown in FIG. 3, FIG. 3 is a schematic structural diagram of an elastic structure, after being deformed, of a backlight module according to an embodiment of the present disclosure. When the light guide plate 30 is assembled, after a sidewall of the light guide plate 30 contacts with one of the convex portions 101 of the elastic structure 100, one of the convex portions 101 is offset toward a side of one of the groove portions 102 due to being squeezed by the light guide plate 30, and one of the groove portions 102 is deformed. As shown in the figures, a force is applied by the groove portions 102 to the light guide plate 30 through the convex portions 101, so that the elastic structure 100 forms an interference fit with the light guide plate 30, so as to achieve limiting and fixing a location of the light guide plate 30. In addition, after the groove portions 102 are deformed, a peripheral edge of the light guide plate 30 is attached to the sidewall of the plastic frame 10, and a contact area between the light guide plate 30 and the plastic frame 10 is increased. Therefore, a stability of the light guide plate 30 is further improved.

The present application also provides a display device including a display panel and a backlight module as described above. The display device is suitable for on-board display, but is not limited thereto. The display panel may be a liquid crystal display panel, an organic light-emitting diode (OLED) display panel, a white OLED (WOLED) display panel, or the like.

From above, the backlight module and the display device provided by the present application form an elastic structure by designing convex portions and groove portions on a plastic frame. When the elastic structure is in contact with a side wall of the light guide plate, the convex portions are squeezed by the light guide plate to deform the groove portions, so that the elastic structure forms an interference fit with the light guide plate to achieve limiting and fixing a location of the light guide plate. By adopting this design, cost and production man-hour of the additional design of the rubber blocks can be omitted, and at the same time, a phenomenon that a light guide plate hits a sidewall to generate abnormal sound when a backlight module is shaken and a phenomenon of optical defects caused by mesh scratches on the light guide plate can be avoided.

As described above, although the present disclosure has been described in preferred embodiments, they are not intended to limit the disclosure. One of ordinary skill in the art, without departing from the spirit and scope of the disclosure within, can make various modifications and variations, so the range of the scope of the disclosure is defined by the claims.

The invention claimed is:

1. A backlight module, comprising:
    a plastic frame; and
    a light source, a light guide plate, and an optical film sheet, all of which being located in the plastic frame;
    wherein at least two sidewalls of the plastic frame are provided with an elastic structure, the elastic structure contacts with a sidewall of the light guide plate and a sidewall of the optical film sheet, and the elastic structure forms an interference fit with the light guide plate and the optical film sheet to fix the light guide plate and the optical film sheet in the plastic frame.

2. The backlight module according to claim 1, wherein the elastic structure is integrally formed with the plastic frame, the elastic structure comprises convex portions and groove portions aligned to the convex portions, the convex portions are located on a sidewall of the plastic frame adjacent to a side of the light guide plate, and openings of the groove portions are located in a top portion of the plastic frame.

3. The backlight module according to claim 2, wherein one of the groove portions is at least aligned to one of the convex portions, wherein length of one of the groove portions is greater than or equal to length of one of the convex portions in a length extending direction of the one of the groove portions.

4. The backlight module according to claim 2, wherein depth of one of the groove portions is greater than or equal to width of one of the convex portions in a depth extending direction of the one of the groove portions.

5. The backlight module according to claim 2, wherein a distance between a boundary of the plastic frame adjacent to the side of the light guide plate and one of the groove portions is less than or equal to a distance between a boundary of the plastic frame away from the side of the light guide plate and one of the groove portions.

6. The backlight module according to claim 2, wherein cross-sectional shapes of the convex portions are at least one of a rectangular shape, a trapezoidal shape, an arc shape, and any combination thereof.

7. The backlight module according to claim 2, wherein a rounded corner is formed between an inner wall of one of the groove portions adjacent to the side of the light guide plate and an adjacent inner wall.

8. The backlight module according to claim 2, wherein when the light guide plate is assembled, a sidewall of the light guide plate contacts with one of the convex portions of the elastic structure, one of the convex portions is offset toward a side of one of the groove portions due to being squeezed by the light guide plate, and one of the groove portions is deformed such that the elastic structure forms the interference fit with the light guide plate.

9. The backlight module according to claim 2, wherein when the optical film sheet is assembled, a sidewall of the optical film sheet contacts with one of the convex portions of the elastic structure, one of the convex portions is offset toward a side of one of the groove portions by the optical film sheet, and one of the groove portions is deformed such that the elastic structure forms an interference fit with the optical film sheet.

10. A backlight module, comprising:
a plastic frame; and
a light source, a light guide plate, and an optical film sheet, all of which being located in the plastic frame; wherein the plastic frame is provided with an elastic structure, the elastic structure contacts with a sidewall of the light guide plate, and the elastic structure forms an interference fit with the light guide plate to fix the light guide plate in the plastic frame, wherein the elastic structure is integrally formed with the plastic frame, the elastic structure comprises convex portions and groove portions aligned to the convex portions, the convex portions are located on a sidewall of the plastic frame adjacent to a side of the light guide plate, and openings of the groove portions are located in a top portion of the plastic frame.

11. The backlight module according to claim 10, wherein one of the groove portions is at least aligned to one of the convex portions, wherein length of one of the groove portions is greater than or equal to length of one of the convex portions in a length extending direction of the one of the groove portions.

12. The backlight module according to claim 10, wherein depth of one of the groove portions is greater than or equal to width of one of the convex portions in a depth extending direction of the one of the groove portions.

13. The backlight module according to claim 10, wherein a distance between a boundary of the plastic frame adjacent to the side of the light guide plate and one of the groove portions is less than or equal to a distance between a boundary of the plastic frame away from the side of the light guide plate and one of the groove portions.

14. The backlight module according to claim 10, wherein cross-sectional shapes of the convex portions are at least one of a rectangular shape, a trapezoidal shape, an arc shape, and any combination thereof.

15. The backlight module according to claim 10, wherein a rounded corner is formed between an inner wall of one of the groove portions adjacent to the side of the light guide plate and an adjacent inner wall.

16. The backlight module according to claim 10, wherein when the light guide plate is assembled, a sidewall of the light guide plate contacts with one of the convex portions of the elastic structure, one of the convex portions is offset toward a side of one of the groove portions due to being squeezed by the light guide plate, and one of the groove portions is deformed such that the elastic structure forms the interference fit with the light guide plate.

17. A display device, comprising a display panel and the backlight module according to claim 10.

\* \* \* \* \*